(12) United States Patent
Usui et al.

(10) Patent No.: US 7,221,128 B2
(45) Date of Patent: May 22, 2007

(54) CONVERTER WITH START-UP CIRCUIT

(75) Inventors: Hiroshi Usui, Niiza (JP); Yukinari Fukumoto, Niiza (JP); Yasuhiro Rikiishi, Niiza (JP); Syouhei Osaka, Niiza (JP)

(73) Assignee: Sanken Electric Co., Ltd. (JP)

( * ) Notice: Subject to any disclaimer, the term of this patent is extended or adjusted under 35 U.S.C. 154(b) by 126 days.

(21) Appl. No.: 10/514,093

(22) PCT Filed: May 28, 2003

(86) PCT No.: PCT/JP03/06656

§ 371 (c)(1),
(2), (4) Date: Nov. 10, 2004

(87) PCT Pub. No.: WO03/103121

PCT Pub. Date: Dec. 11, 2003

(65) Prior Publication Data

US 2005/0201123 A1 Sep. 15, 2005

(30) Foreign Application Priority Data

May 30, 2002 (JP) .............................. 2002-157456

(51) Int. Cl.
*G05F 1/70* (2006.01)
(52) U.S. Cl. ....................... 323/207; 363/21.12; 363/49
(58) Field of Classification Search ................ 323/207; 363/21.12, 21.16, 49

See application file for complete search history.

(56) References Cited

U.S. PATENT DOCUMENTS

| 4,642,746 A | | 2/1987 | Lösel | |
|---|---|---|---|---|
| 5,754,415 A | * | 5/1998 | Blackmon | ................. 363/21.16 |
| 6,980,446 B2 | * | 12/2005 | Simada et al. | ................. 363/49 |

FOREIGN PATENT DOCUMENTS

| JP | 59-145287 | 9/1984 |
|---|---|---|
| JP | 60-249868 | 12/1985 |
| JP | 2-10790 | 1/1990 |
| JP | 08-140344 | 5/1996 |
| JP | 08-205530 | 8/1996 |
| JP | 09-9626 | 1/1997 |
| JP | 11-32478 | 2/1999 |
| JP | 2000-23461 | 1/2000 |
| JP | 2000-60118 | 2/2000 |
| JP | 2000-295843 | 10/2000 |
| JP | 2001-309653 | 11/2001 |

* cited by examiner

*Primary Examiner*—Shawn Riley
(74) *Attorney, Agent, or Firm*—Kilpatrick Stockton LLP

(57) ABSTRACT

A converter is provided in which the cost and size of which are reduced by a decrease in current consumption with no need of large elements or radiation fins. The converter has a switching element (Q1) being connected to a DC power source through a primary winding (P) of a transformer (T), a control circuit (4) for turning on/off the switching element (Q1), a diode (D51) and a capacitor (C51) for rectifying/smoothing the voltage induced in the secondary winding (S) of the transformer (T) to extract DC output, and a starting circuit (5) for starting the control circuit (4). The starting circuit (5) operates as a constant current circuit (Q2, R1, R2, ZD1, D1) while starting the control circuit (4), and as a constant voltage circuit (Q2, R1, R2, ZD2, D1) after starting the control circuits (4).

13 Claims, 12 Drawing Sheets

CONVERTER WITH START-UP CIRCUIT

TECHNICAL FIELD

The present invention relates to a converter, and particularly, to a start-up circuit provided for a DC-DC converter.

BACKGROUND TECHNOLOGY

FIG. 1 shows an example of a conventional DC-DC converter of that type. In FIG. 1, a sinusoidal wave voltage from an AC power source 1 is rectified and smoothed by a full-wave rectifying circuit 2 and a capacitor C1, to produce a DC voltage. The produced DC voltage is passed through a switching element Q1 and is applied to a primary winding P of a transformer T. The switching element Q1 is ON/OFF-controlled according to a drive signal from a control circuit 4. Although not shown, the control circuit 4 can control various circuits such as an output voltage feedback circuit, an output current feedback circuit, an output overvoltage protection circuit, an output voltage decrease detection circuit, and an overheat protection circuit.

The DC voltage generated by the capacitor C1 turns on a constant-current start-up circuit 5 consisting of a switching element Q2 made of a MOSFET, a resistor R1, a resistor R2, a Zener diode ZD1, and a diode D1. Namely, the DC voltage is passed through the resistor R1 and is applied to a gate of the switching element Q2 to turn on the switching element Q2, to thereby pass a constant current through a route of the switching element Q2, resistor R2, diode D1, and capacitor C2. This results in charging the capacitor C2. When the voltage of the capacitor C2 reaches a start-up voltage (for example, 16 V) of the control circuit 4, the control circuit 4 starts to output a drive signal to the switching element Q1.

In response to the drive signal, the switching element Q1 starts to turn on and off. When the switching element Q1 is ON, the voltage is applied to the primary winding P of the transformer T, which accumulates energy.

When the switching element Q1 is OFF, the energy accumulated in the transformer T is discharged as electrical energy from a secondary winding S of the transformer T. This voltage is rectified and smoothed by a diode D51 and a capacitor C51, to provide a required DC voltage. The transformer T has a tertiary winding C serving as a power source for the control circuit 4. A voltage generated by the tertiary winding C is rectified and smoothed by a diode D2 and the capacitor C2, to provide a source voltage for the control circuit 4.

The start-up circuit 5 consumes large power because it receives a current from the high-voltage power source. If a large start-up current is needed to shorten a start-up time of the DC-DC converter, it will involve increased energy. Accordingly, a start-up control circuit 6 having a diode 3, a resistor R3, a resistor R4, a capacitor C3, and a switching element Q3 detects a start of the DC-DC converter (corresponding to a start of the control circuit 4) according to a voltage generated by the tertiary winding C of the transformer T, and according to the detected voltage, turns on the switching element Q3. This brings a gate bias voltage of the switching element Q2 nearly to a ground voltage, to turn off the switching element Q2. This results in turning off the start-up circuit 5. In this way, the start-up circuit 5 is turned off after a start of the DC-DC converter, to reduce unnecessary power consumption.

DISCLOSURE OF INVENTION

The conventional DC-DC converter, however, has unsolved problems mentioned below. For example, if the DC-DC converter develops an overheat or overvoltage state and the control circuit 4 is latched (storing data in a flip-flop FF41) to stop operation, the control circuit 4 provides no drive signal to the switching element Q1. Then, the tertiary winding C of the transformer T generates no voltage, and therefore, the switching element Q3 in the start-up control circuit 6 is not turned on. In this case, the start-up circuit 5 continuously operates to cause a large energy loss. For this, even a normal operation that may involve no loss needs large elements and large radiation fins to cope with an overheat or overvoltage state. This increases the cost and size of the converter.

If the DC-DC converter develops an overload state, a protection circuit 10 decreases the voltage of the tertiary winding C of the transformer T. If this voltage reaches a stop voltage to stop the control circuit 4, the control circuit 4 stops to stop the DC-DC converter. If the DC-DC converter stops, the switching element Q3 in the start-up control circuit 6 turns off to turn on the start-up circuit 5. While the DC-DC converter keeps the overload state, these operations are repeated so that the DC-DC converter repeatedly starts and stops. A repetition period of the start and stop is determined by a constant current value of the start-up circuit 5, a capacity of the capacitor C2, and the like. If the repetition period is short, the start-up circuit 5 must bear large load to increase a loss. To elongate the repetition period, the constant current value of the start-up circuit 5 and the capacity of the capacitor C2 must be increased. This, however, elongates the start-up time.

According to the conventional DC-DC converter of this type, the DC-DC converter operates for a while after the AC power source 1 is turned off only with energy accumulated in the capacitor C1. If the voltage of the capacitor C1 drops so that the DC-DC converter is unable to maintain an output, the voltage of the tertiary winding C of the transformer T decreases. When this voltage reaches the stop voltage of the control circuit 4, the control circuit 4 stops to stop the DC-DC converter. If the DC-DC converter stops, the switching element Q3 in the start-up control circuit 6 turns off to again turn on the start-up circuit 5. If the voltage of the capacitor C2 reaches a start-up voltage of the control circuit 4, the control circuit 4 starts to again start the DC-DC converter. Then, the switching element Q3 in the start-up control circuit 6 again turns on to turn off the start-up circuit 5. The voltage of the capacitor C1, however, is low, and therefore, the voltage of the tertiary winding C of the transformer T is too low to maintain the operation of the control circuit 4. As a result, the control circuit 4 again stops. In this way, after the AC power source 1 is turned off, the DC-DC converter repeats the start and stop operations for a while.

The present invention provides a converter capable of reducing current consumption even if a DC-DC converter develops an overheat or overvoltage state, employing no large elements or large radiation fins, and reducing the cost and size thereof.

The present invention also provides a converter capable of surely stopping a DC-DC converter when an AC power source is turned off.

To achieve the objects, an invention of claim 1 provides a converter having a first switching element connected to a DC power source through a primary winding of a transformer, a control circuit to conduct ON/OFF control on the first switching element, an output rectifying/smoothing circuit to rectify and smooth a voltage induced on a secondary winding of the transformer and provide a. DC output, and a start-up circuit to start the control circuit. The start-up circuit operates as a constant current circuit when starting the control circuit and as a constant voltage circuit after starting the control circuit.

An invention of claim 2 provides the converter with a start-up control circuit to detect a start of the control circuit according to a voltage generated by a tertiary winding of the transformer and switch the constant current circuit operation to the constant voltage circuit operation, and a voltage supply part to supply the voltage generated by the tertiary winding of the transformer to the control circuit.

According to an invention of claim 3, the control circuit, if brought into a latched state by a protection circuit, provides the start-up control circuit with a latch signal whose voltage is lower than the start-up voltage and corresponds to a voltage to maintain the latched state. The start-up control circuit operates in response to the latch signal, to make the start-up circuit operate as the constant voltage circuit.

An invention of claim 4 provides the converter with a rectifying/smoothing circuit connected to an AC power source, to rectify and smooth AC power and produce DC power. The AC power source and rectifying/smoothing circuit form the DC power source.

An invention of claim 5 provides the converter with a rectifying circuit connected to an AC power source, to full-wave-rectify an AC voltage and a power-factor improving circuit to receive a full-wave-rectified output from the rectifying circuit through a choke coil, turn on and off, rectify, and smooth the received output with a second switching element, and provide a DC output. The AC power source, rectifying circuit, and power-factor improving circuit form the DC power source.

According to an invention of claim 6, a bias voltage or current to a control terminal of a start-up switching element in the start-up circuit is supplied from the DC power source.

According to an invention of claim 7, a bias voltage or current to a control terminal of a start-up switching element in the start-up circuit is supplied from the AC power source.

According to an invention of claim 8, a bias voltage or current to a control terminal of a start-up switching element in the start-up circuit is supplied from a front stage of the power-factor improving circuit.

An invention of claim 9 provides a converter having a rectifying/smoothing circuit connected to an AC power source, to rectify and smooth an AC voltage, a first switching element connected to an output side of the rectifying/smoothing circuit through a primary winding of a transformer, a control circuit to conduct ON/OFF control on the first switching element, a rectifying/smoothing circuit to rectify and smooth a voltage induced on a secondary winding of the transformer and provide a DC output, and a start-up circuit to start the control circuit. A bias voltage or current to a control terminal of a start-up switching element in the start-up circuit is supplied from the AC power source.

An invention of claim 10 provides a converter having a rectifying circuit connected to an AC power source, to full-wave-rectify an AC voltage, a power-factor improving circuit to receive a full-wave-rectified waveform from the rectifying circuit through a choke coil, turn on and off, rectify, and smooth the received output with a second switching element, and provide a DC output, a first switching element connected to an output side of the power-factor improving circuit through a primary winding of a transformer, a control circuit to conduct ON/OFF control on the first switching element, an output rectifying/smoothing circuit to rectify and smooth a voltage induced on a secondary winding of the transformer and provide a DC output, and a start-up circuit to start the control circuit. A bias voltage or current to a control terminal of a start-up switching element in the start-up circuit is supplied from a front stage of the power-factor improving circuit.

An invention of claim 11 provides the start-up circuit with a capacitor to hold the bias voltage or current for a half period of a frequency of the AC power source.

BEST MODE OF IMPLEMENTATION

Converters according to embodiments of the present invention will be explained with reference to the drawings.

First Embodiment

Figure 1:
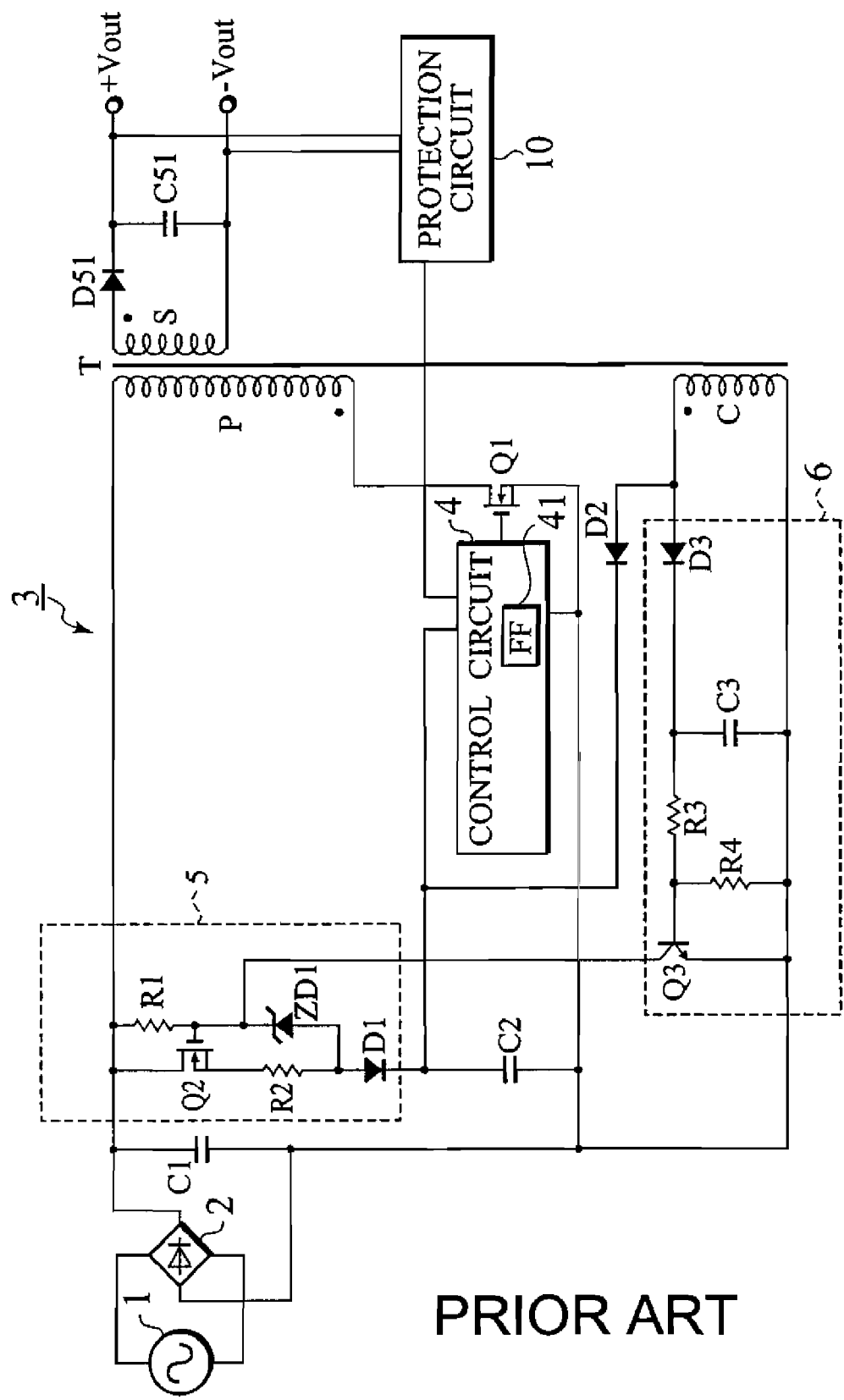
FIG. 1 is a view showing an arrangement of a conventional DC-DC converter.
Figure 2:
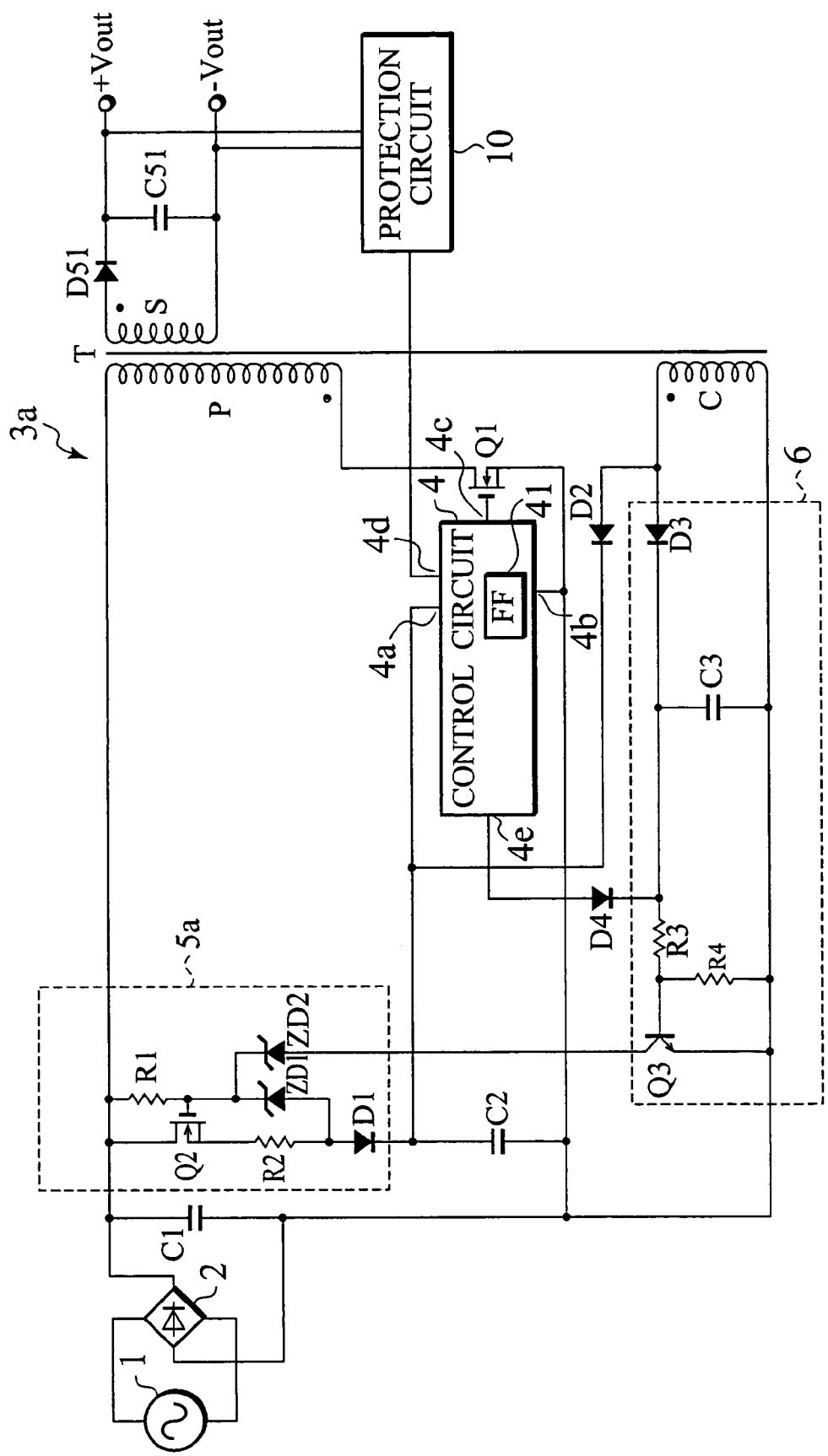
FIG. 2 is a view showing an arrangement of a DC-DC converter according to a first embodiment of the present invention.

FIG. 2 is a view showing an arrangement of a DC-DC converter according to the first embodiment of the present invention. The DC-DC converter of FIG. 2 is different from the conventional DC-DC converter of FIG. 1 in that it additionally has a Zener diode ZD2 and a diode D4. In the DC-DC converter of FIG. 2, the same parts as those of the conventional converter of FIG. 1 are represented with the same reference marks.

In FIG. 2, a sinusoidal wave voltage from an AC power source 1 is rectified and smoothed by a full-wave rectifying circuit 2 and a capacitor C1, to provide a DC voltage. The DC voltage is supplied to the DC-DC converter 3a, which converts the input DC voltage into another DC voltage that is output from output terminals +Vout and −Vout.

The arrangement of the DC-DC converter 3a will be explained in detail. The capacitor C1 is connected through a primary winding P of a transformer T to a switching element Q1 made of a MOSFET. The switching element Q1 is turned on and off under PWM control by a control circuit 4. A secondary winding S of the transformer T is connected to a rectifying/smoothing circuit made of a diode D51 and a capacitor C51. The rectifying/smoothing circuit rectifies and smoothes a voltage (ON/OFF-controlled pulse voltage) induced on the secondary winding S of the transformer T and provides a DC output from the output terminals +Vout and −Vout. A protection circuit 10 detects an overvoltage state or an overheat state of the DC-DC converter 3a according to the DC output of the rectifying/smoothing circuit and puts the control circuit 4 into a latched state to stop the same.

A first end of the capacitor C1 is connected to a start-up circuit 5a consisting of a switching element Q2 made of a MOSFET, a resistor R1, a resistor R2, a Zener diode ZD1, the Zener diode ZD2, and a diode D1. A drain of the switching element Q2 is connected to the first end of the capacitor C1, and between the drain and gate (a control terminal of the present invention) of the switching element Q2, the resistor R1 is connected. A source of the switching element Q2 is connected to a first end of the resistor R2. A second end of the resistor R2 is connected to an anode of the Zener diode ZD1 and an anode of the diode D1. A cathode of the diode D1 is connected to a first end of a capacitor C2 that supplies a voltage to start the control circuit 4. A cathode of the Zener diode ZD1 is connected to the gate of the switching element Q2 and a cathode of the Zener diode ZD2. An anode of the Zener diode ZD2 is connected to a collector of a switching element Q3 made of a bipolar transistor in a start-up control circuit 6.

The switching element Q2, resistor R1, resistor R2, Zener diode ZD1, and diode D1 operate as a constant current circuit. The switching element Q2, resistor R1, resistor R2, Zener diode ZD2, and diode D1 operate as a constant voltage circuit. With the Zener diode ZD2, the start-up circuit 5a can operate as the constant current circuit when starting the control circuit 4 and as the constant voltage circuit after starting the control circuit 4. A breakdown voltage of the Zener diode ZD2 is adjusted to a constant voltage (for example, 8 V) that is smaller than a voltage generated by a tertiary winding C of the transformer T.

The control circuit 4 starts to operate according to a voltage (for example, 16 V) supplied from the capacitor C2 and provides the switching element Q1 with a drive signal from an output terminal 4c. If the DC-DC converter 3a develops an overheat state, an overvoltage state, or an overload state, an input terminal 4d of the control circuit 4 receives a protection signal from the protection circuit 10, and a flip-flop FF41 establishes a latched state (or holding data at certain timing). As a result, the control circuit 4 stops, and no drive signal is provided from the output terminal 4c to the switching element Q1. At the same time, the control circuit 4 provides a latch signal through the diode D4 to a first end of a capacitor C3 in the start-up control circuit 6. When the control circuit 4 is in the latched state, minimum power (for example, a power source voltage of 6 V) to keep the latched state is supplied from the constant voltage circuit of the start-up circuit 5a to power source input terminals 4a and 4b of the control circuit 4 through the capacitor C2.

A first end of the tertiary winding C of the transformer T is connected to an anode of a diode D2, and a cathode of the diode D2 is connected to the first end of the capacitor C2 and the control circuit 4. The start-up control circuit 6 employs a diode D3, a resistor R3, a resistor R4, and the capacitor C3 to rectify and smooth a voltage from the tertiary winding C and apply the voltage to a base of the switching element Q3. Namely, when detecting a start of the DC-DC converter 3a, the start-up control circuit 6 turns on the switching element Q3 to break down the Zener diode ZD2 and operate the start-up circuit 5a as the constant voltage circuit. If the DC-DC converter 3a shows an overheat state, overvoltage state, or overload state, the first end of the capacitor C3 of the start-up control circuit 6 receives a latch signal from the control circuit 4 through the diode D4. According to a voltage based on the latch signal, the switching element Q3 is turned on to break down the Zener diode ZD2 to operate the start-up circuit 5a as the constant voltage circuit.

Figure 3:
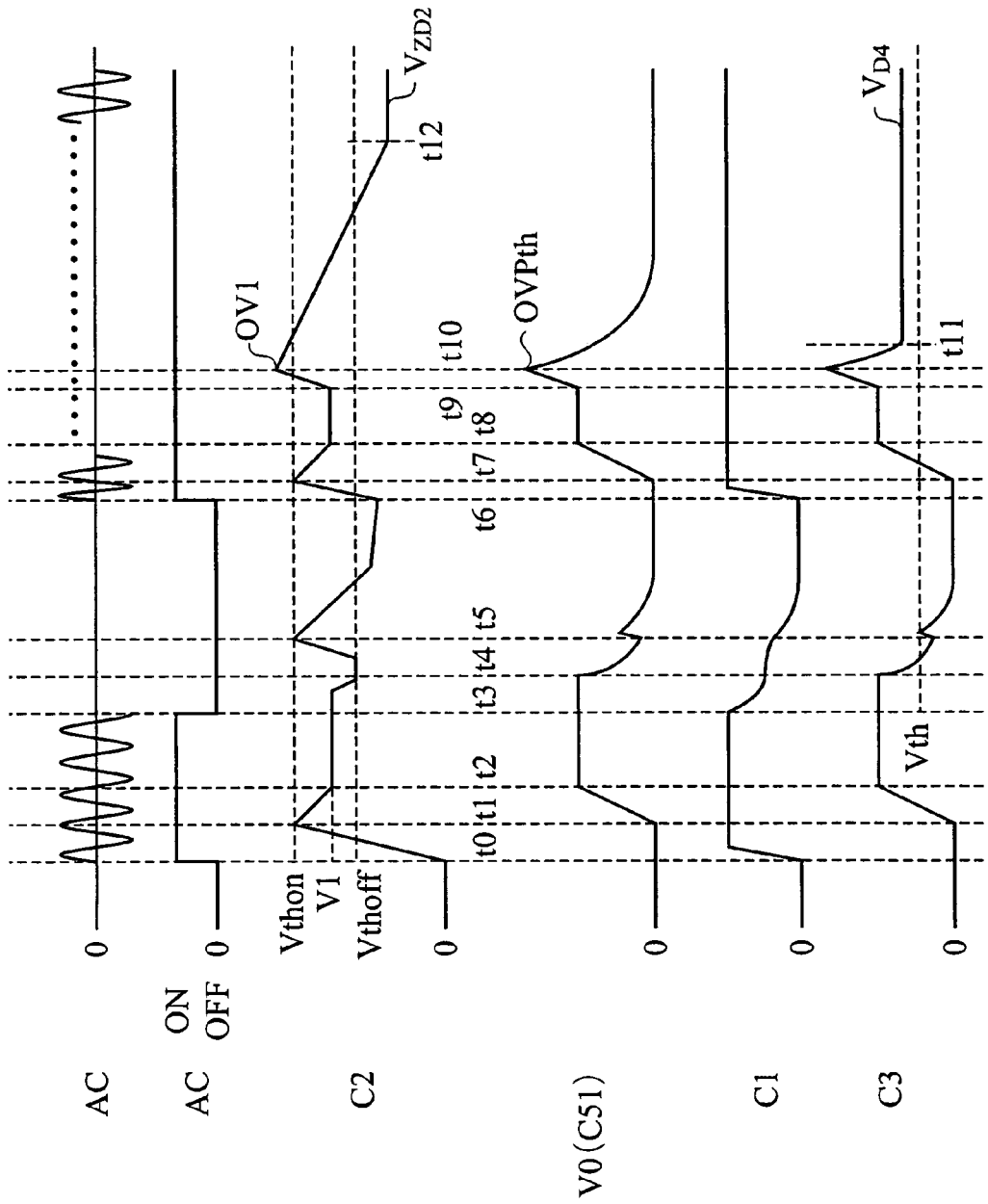
FIG. 3 is a timing chart showing parts of the DC-DC converter according to the first embodiment of the present invention.

Operation of the DC-DC converter according to the first embodiment with the above-mentioned arrangement will be explained with reference to the timing chart of FIG. 3. In FIG. 3, AC indicates a sinusoidal wave voltage of the AC power source 1, C2 a voltage of the capacitor C2, V0 a voltage of the capacitor C51, C1 a voltage of the capacitor C1, and C3 a voltage of the capacitor C3.

At time t0, the sinusoidal wave voltage from the AC power source 1 is applied to the full-wave rectifying circuit 2. The sinusoidal wave voltage is full-wave rectified by the full-wave rectifying circuit 2 and is smoothed by the capacitor C1. As a result, the DC voltage of the capacitor C1 steeply increases to a given DC voltage. This DC voltage is applied through the switching element Q1 to the primary winding P of the transformer T.

On the other hand, the DC voltage generated at the ends of the capacitor C1 operates the constant current circuit consisting of the switching element Q2, resistor R1, resistor R2, Zener diode ZD1, and diode D1. Namely, the DC voltage is applied through the resistor R1 to the gate of the switching element Q2 to turn on the switching element Q2 and pass a constant current through a route of the switching element Q2, resistor R2, diode D1, and capacitor C2. The capacitor C2 is charged, and the voltage of the capacitor C2 linearly increases to reach a start-up voltage Vthon (for example, 16 V) to start the control circuit 4 at time t1. Then, the control circuit 4 starts to provide the switching element Q1 with a drive signal. The charge of the capacitor C2 is consumed to operate the control circuit 4, and therefore, the voltage of the capacitor C2 gradually drops to a constant voltage V1 (for example, 12 V) at time t2.

On the other hand, at time t1, the switching element Q1 starts to turn on and off in response to the drive signal. When the switching element Q1 is ON, a voltage is applied to the primary winding P of the transformer T, which accumulates energy. When the switching element Q1 is turned off, the energy accumulated in the transformer T is discharged as electrical energy from the secondary winding S of the transformer T. This voltage is rectified and smoothed by the diode D51 and capacitor C51, to provide a required DC voltage. As a result, the voltage V0 of the capacitor C51 increases from time t1 to time t2 and becomes a constant value at time t2.

A voltage generated by the tertiary winding C is rectified and smoothed by the diode D2 and capacitor C2, and an obtained voltage of, for example, 12 V is applied to the control circuit 4. The voltage of the capacitor C3, which is obtained by rectifying and smoothing the voltage generated by the tertiary winding C, also increases like the voltage V0 of the capacitor C51 and reaches a constant value at time t2. The voltage of the capacitor C3 is applied to the base of the switching element Q3.

Namely, detecting a start of the DC-DC converter 3a turns on the switching element Q3, and therefore, the Zener diode ZD2 breaks down to operate the start-up circuit 5a as the constant voltage circuit. At this time, a cathode voltage of the Zener diode ZD2 is about 8 V. In consideration of a voltage drop of the Zener diode ZD1, the anode of the diode D1 receives about 6 V. When the control circuit 4 is operating, a voltage of 16 V is being applied thereto, and therefore, the cathode of the diode D1 receives about 16 V. As a result, the diode D1 is put in a reversely biased state to pass no current. Namely, after the start of the control circuit 4, the diode D1 is turned off to cause no loss.

At time t3, the AC power source 1 is turned off, and the voltage of the capacitor C1 gradually drops from time t3. The voltage of the capacitor C2 maintains a constant voltage V1 until just before time t4 and drops to a stop voltage Vthoff (for example, 10 V) at time t4 to stop the control circuit 4. Then, the control circuit 4 stops. The voltage of the capacitor C51 and the voltage of the capacitor C3 are constant up to time t4, and after time t4, decrease because the control circuit 4 is stopped.

After time t4, the voltage of the capacitor C3 drops below a threshold voltage Vth and the transistor Q3 is turned off so that the Zener diode ZD2 does not break down (OFF state). Namely, the start-up circuit 5a is switched from the constant voltage circuit to the constant current circuit, to pass a current through the diode D1. As a result, the voltage of the capacitor C2 linearly increases to reach the start-up voltage Vthon at time t5. Then, the control circuit 4 is started to provide the switching element Q1 with a drive signal. At this time, the AC power source 1 is OFF, and therefore, the voltage of the capacitor C1 decreases and the voltage of the capacitor C2 gradually drops below the stop voltage Vthoff.

On the other hand, at time t5, the switching element Q1 starts to turn on and off in response to the drive signal, and the voltage of the capacitor C51 and the voltage of the capacitor C3 increase. However, they decrease as the voltage of the capacitor C1 decreases because the AC power source 1 is OFF.

At time t6, the AC power source 1 is turned on. Operations of the parts between time t6 and time t9 are the same as those between time t0 and time t3, and therefore, the detail explanation thereof is omitted.

At time t10, if the DC-DC converter 3a develops an overvoltage state due to some reason, the voltage of the capacitor C2 becomes higher (OV1) than the start-up voltage Vthon. The voltage of the capacitor C51 and the voltage of the capacitor C3 also become higher than the above-mentioned constant voltages.

At this time, the protection circuit 10 detects the voltage of the capacitor C51, determines that the voltage is abnormal, puts the control circuit 4 into a latched state; and stops the operation thereof. Then, an output terminal 4e of the control circuit 4 outputs at time t11 a latch signal of a voltage (for example, 6 V) higher than the threshold voltage Vth. The latch signal is applied through the diode D4 to the capacitor C3 in the start-up control circuit 6. Due to this, the switching element Q3 maintains an ON state even if the control circuit 4 is in the latched state. Since the switching element Q3 keeps the ON state, the start-up circuit 5a operates as the constant voltage circuit.

At this time, the voltage of the cathode of the Zener diode ZD2 is about 8 V, and therefore, the diode D1 is turned on. A voltage of about 6 V is applied to the cathode of the diode D1 and the capacitor C2, and this voltage is applied to the power source input terminals 4a and 4b of the control circuit 4. Accordingly, the voltage of the capacitor C2 gradually drops below the stop voltage Vthoff and reaches about 6 V at time t12. Thereafter, it maintains a constant value. Namely, when the control circuit 4 is in a latched state, minimum power (a power source voltage of 6 V in this example) to maintain the latched state must be supplied to the control circuit 4. This minimum power is supplied from the start-up circuit 5a. At this time, the start-up circuit 5a is operating as the constant voltage circuit. This is advantageous in efficiency because no large current flows. In FIG. 3, VZD2 is a voltage by the Zener diode ZD2, and VD4 is a voltage by the diode D4.

As mentioned above, the DC-DC converter 3a according to the first embodiment employs the Zener diode ZD2, so that the start-up circuit 5a operates as the constant current circuit at a start of the control circuit 4 and as the constant voltage circuit after the start of the control circuit 4. The breakdown voltage of the Zener diode ZD2 is adjusted to a constant voltage smaller than a voltage generated by the tertiary winding C of the transformer T. Accordingly, the diode D1 is OFF during a steady state, to cause no loss. As a result, the converter needs no large elements or large radiation fins, and therefore, can reduce the cost and size thereof.

In a latched state, the control circuit 4 provides the start-up control circuit 6 with a latch signal through the diode D4, so that the switching element Q3 can maintain an ON state and the start-up circuit 5a can operate as the constant voltage circuit even if the control circuit 4 is in the latched state. At this time, the start-up circuit 5a passes no large current and can supply minimum power to the control circuit 4.

According to the conventional DC-DC converter of FIG. 1, the DC-DC converter is stopped if it develops an overload state. Then, the switching element Q3 in the start-up control circuit 6 is turned off to again turn on the start-up circuit 5. In this way, the DC-DC converter repeats start and stop. According to the first embodiment, if the DC-DC converter 3a develops an overload state and stops (the control circuit 4 also stops to establish a latched state), the control circuit 4 outputs a latch signal to turn on the switching element Q3 in the start-up control circuit 6 so that the start-up circuit 5a operates as the constant voltage circuit. This stops restarting and prevents the DC-DC converter from repeating start and stop.

Second Embodiment

Figure 4:
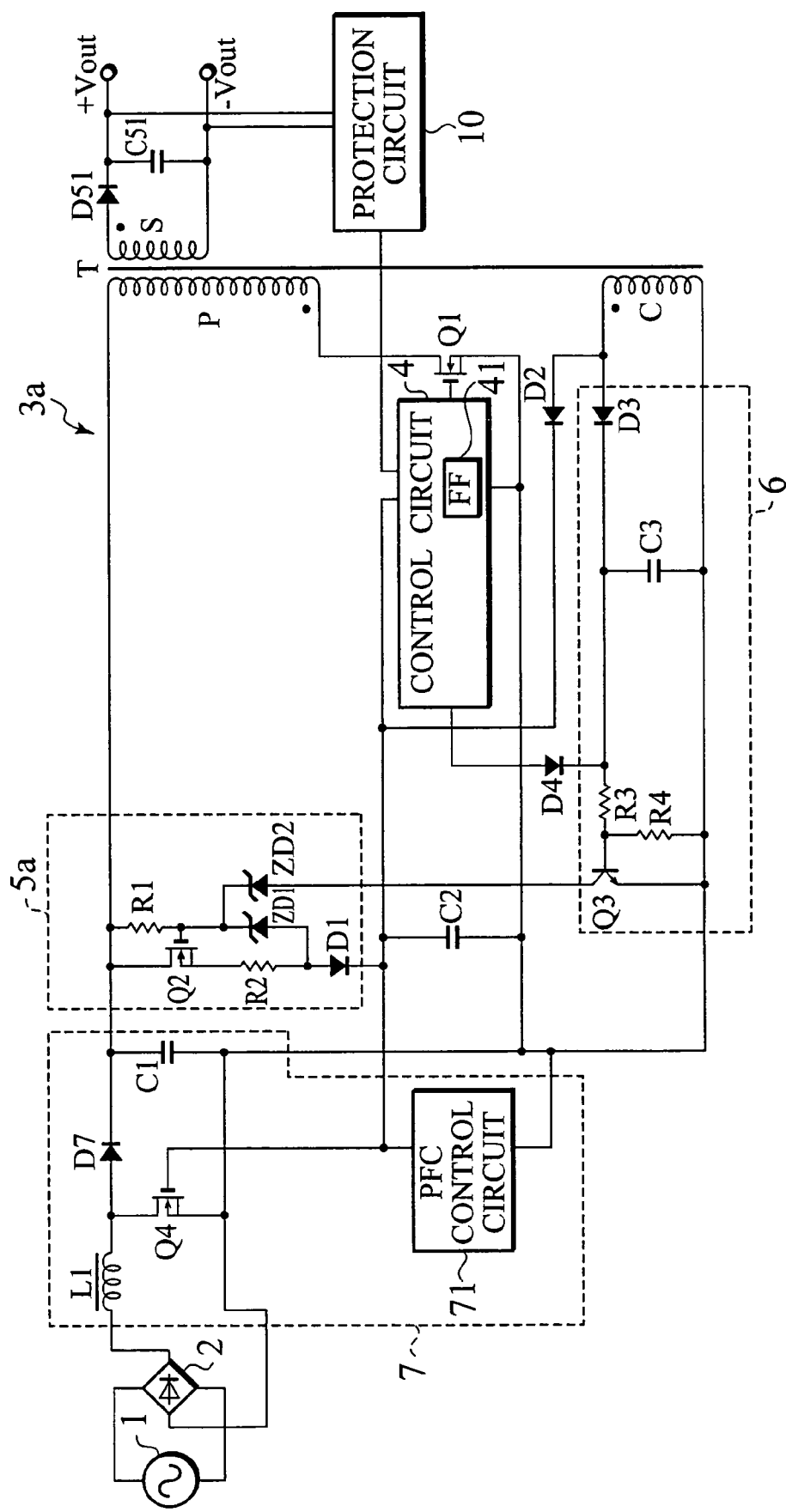
FIG. 4 is a view showing an arrangement of a converter composed of a power-factor improving converter and a DC-DC converter according to a second embodiment of the present invention.

FIG. 4 is a view showing an arrangement of a converter according to the second embodiment of the present invention consisting of a power-factor improving converter and a DC-DC converter. In the converter of the second embodiment, the power-factor converter 7 has a choke coil L1, a switching element Q4, a diode D7, a power-factor improving control circuit (PFC control circuit) 71, and a capacitor C1 and is arranged in front of the DC-DC converter 3a.

The DC-DC converter 3a has already been explained in the first embodiment of FIG. 2, and therefore, will not be explained here. Only the power-factor improving converter 7 will be explained. The details of the arrangement of the power-factor improving converter 7 will be explained later.

In FIG. 4, the choke coil L1, switching element Q4, diode D7, power-factor improving control circuit (PFC control circuit) 71, and capacitor C1 form a step-up chopper circuit. The step-up chopper circuit steps up an input voltage from a full-wave rectifying circuit 2 and provides, from the capacitor C1, a constant DC voltage.

A first end of the full-wave rectifying circuit 2 is connected to a first end of the choke coil L1. A second end of the choke coil L1 is connected to an anode of the diode D7. A cathode of the diode D7 is connected to a first end of the capacitor C1. A connection point between the second end of the choke coil L1 and the anode of the diode D7 is connected to a drain of the switching element Q4 made of a MOSFET. A source of the switching element Q4 is grounded and a gate thereof is connected to the PFC control circuit 71. The PFC control circuit 71 receives source power from the DC-DC converter 3a and conducts ON/OFF control on the switching element Q4, to control an input current waveform to a sinusoidal wave that follows an input voltage waveform and step up an input voltage to a constant DC voltage, which is supplied to the capacitor C1. The DC-DC converter 3a receives a DC voltage from the capacitor C1 and operates like that of the first embodiment of FIG. 2.

In this way, the converter according to the second embodiment with the power-factor improving converter 7 steps up an input voltage to a constant DC voltage and shapes a current from an AC power source 1 into a sinusoidal wave current waveform that follows a voltage of the AC power source 1, to thereby greatly improve a power factor.

Third Embodiment

Figure 5:
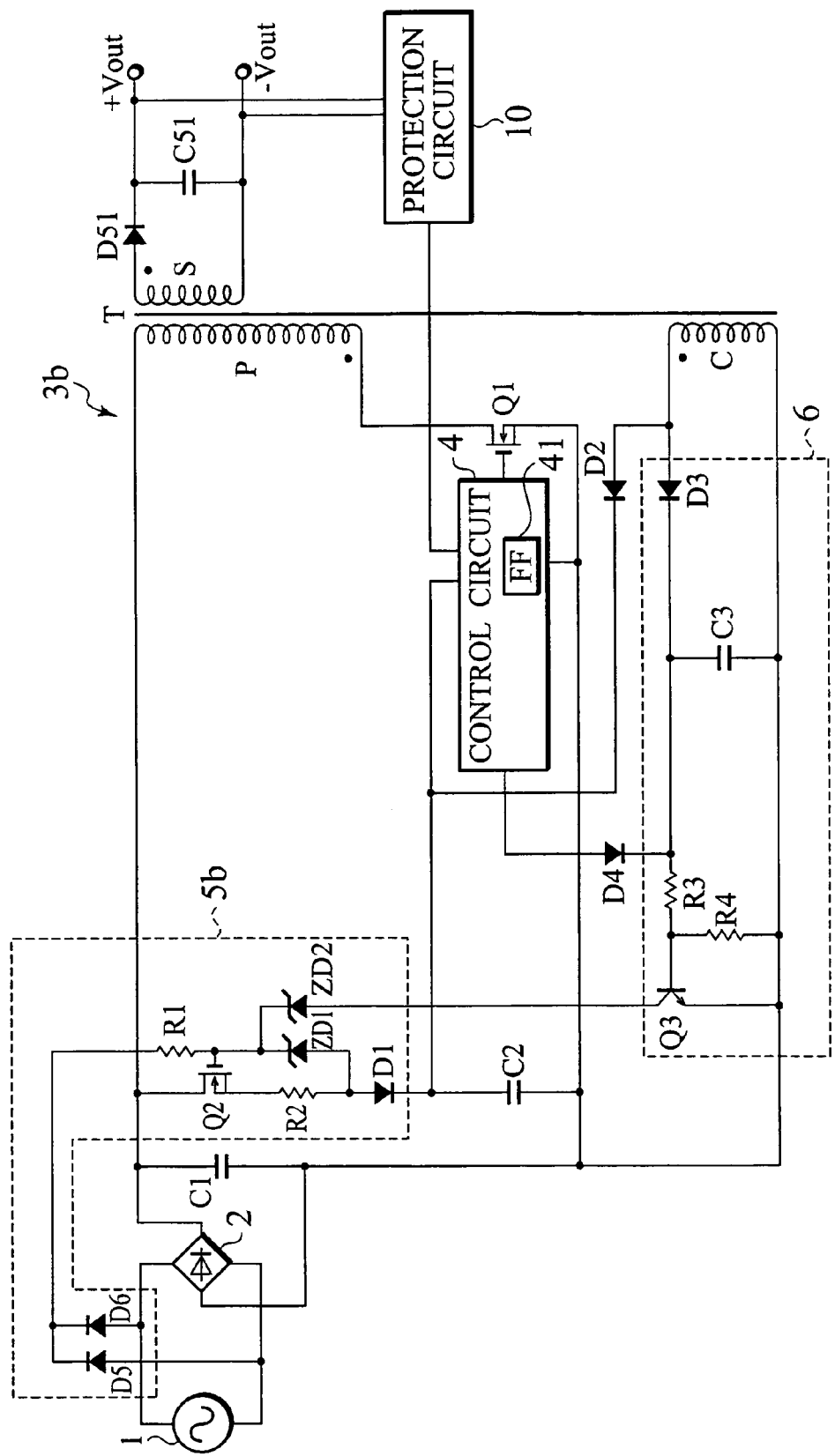
FIG. 5 is a view showing an arrangement of a DC-DC converter according to a third embodiment of the present invention.

FIG. 5 is a view showing a DC-DC converter according to the third embodiment of the present invention. In the DC-DC converter of the first embodiment, a bias voltage to the gate of the switching element Q2 of the start-up circuit 5a is supplied from the capacitor C1. Unlike this, in the DC-DC converter of the third embodiment, a bias voltage to a gate of a switching element Q2 of a start-up circuit 5b is supplied from an AC power source 1 through diodes D5 and D6 and a resistor R1.

In the start-up circuit 5b, a first end of the AC power source 1 is connected to an anode of the diode D5. A cathode of the diode D5 is connected through the resistor R1 to the gate of the switching element Q2. A second end of the AC power source 1 is connected to an anode of the diode D6. A cathode of the diode D6 is connected through the resistor R1 to the gate of the switching element Q2. The other parts of the DC-DC converter of FIG. 5 are the same as those of the DC-DC converter of FIG. 2, and therefore, the same parts are represented with the same reference marks to omit their explanations.

According to the DC-DC converter of the third embodiment, a sinusoidal-wave voltage from the AC power source 1 is rectified by the diodes D5 and D6, and the rectified voltage is passed through the resistor R1 and is applied as a bias voltage to the gate of the switching element Q2 in the start-up circuit 5b. Accordingly, if the AC power source 1 is turned off, the bias voltage to the gate of the switching element Q2 is instantaneously stopped. As a result, the start-up circuit 5b never turns on again, and the DC-DC converter never repeatedly starts and stops.

Figure 6:
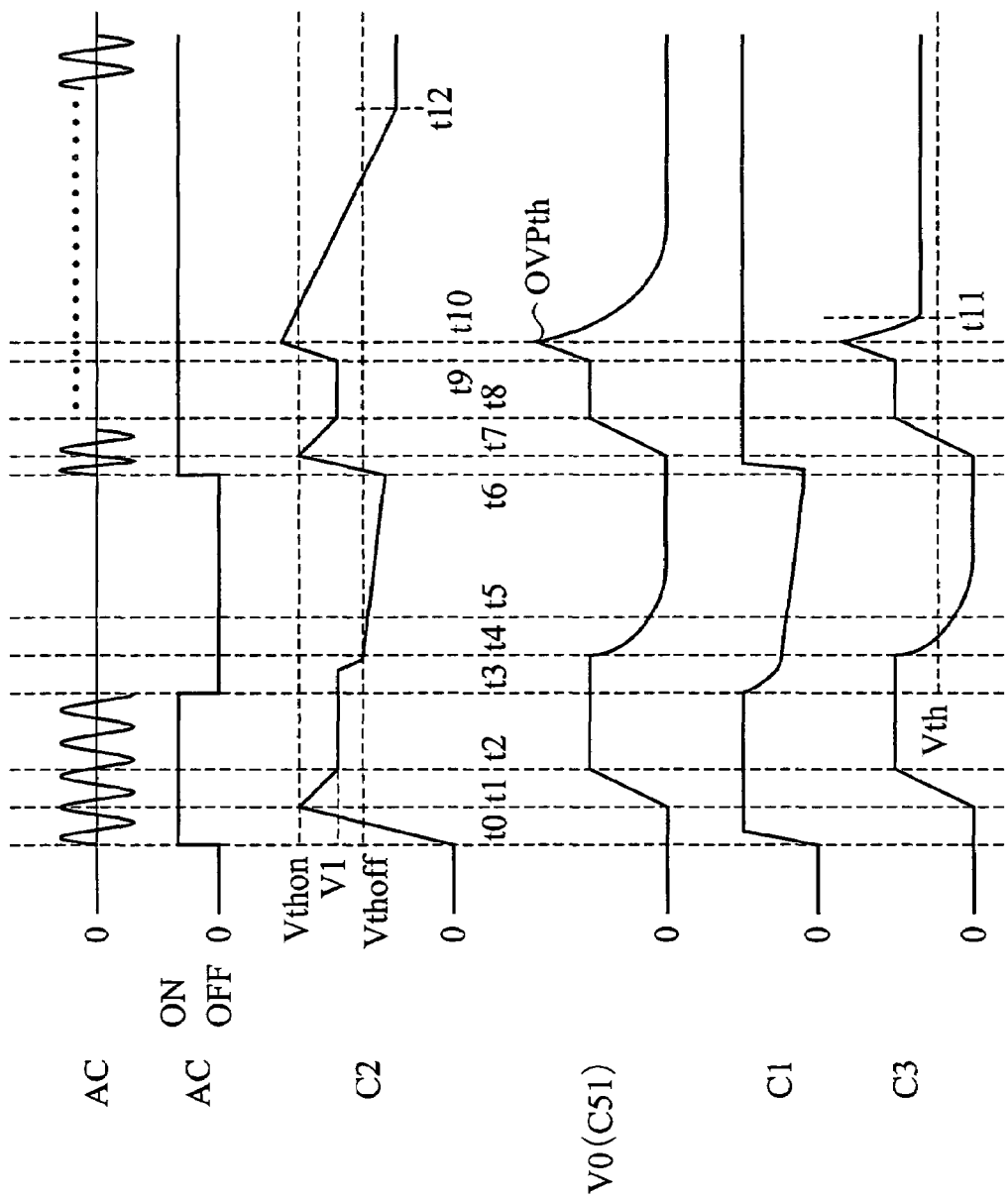
FIG. 6 is a timing chart showing parts of the DC-DC converter according to the third embodiment of the present invention.

FIG. 6 is a timing chart showing the parts of the DC-DC converter according to the third embodiment of the present invention. According to the third embodiment, the start-up circuit 5b does not start again, and therefore, the voltage of a capacitor C2 around time t5 gradually decreases without increasing. The voltage of a capacitor C51 and the voltage of a capacitor C3 also gradually decrease without increasing.

According to the third embodiment, the two diodes D5 and D6 are connected to the ends of the AC power source, respectively. For example, only one of the diodes D5 and D6 may be employed to simplify the structure. Alternatively, none of the two diodes D5 and D6 may be employed, so that the AC power source 1 is directly connected to the resistor R1.

Fourth Embodiment

Figure 7:
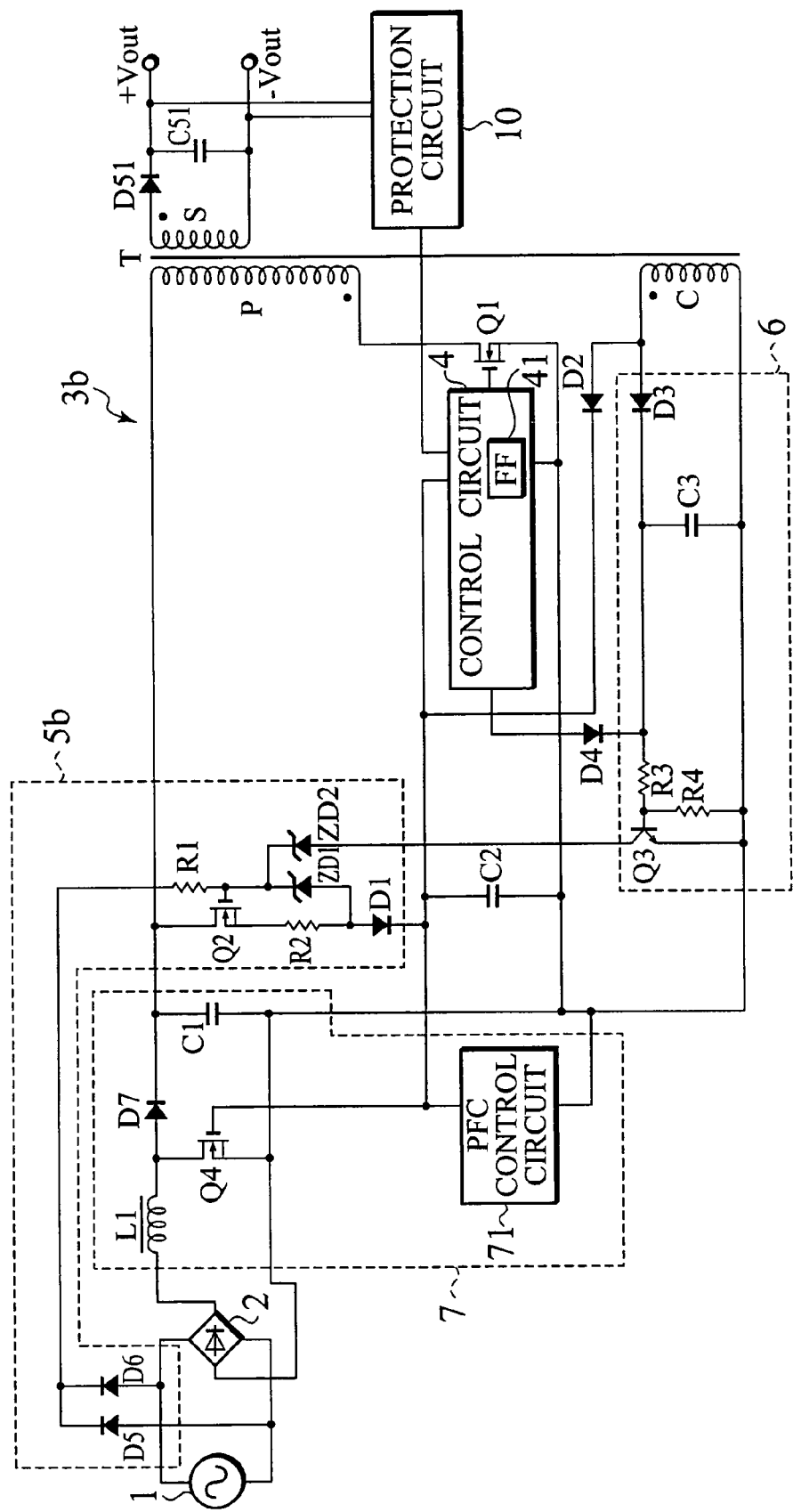
FIG. 7 is a view showing an arrangement of a converter composed of a power-factor improving converter and a DC-DC converter according to a fourth embodiment of the present invention.

FIG. 7 is a view showing an arrangement of a converter according to the fourth embodiment of the present invention, consisting of a power-factor improving converter and a DC-DC converter. The converter of the fourth embodiment includes the power-factor improving converter 7 and DC-DC converter 3b. Namely, the converter of the fourth embodiment adds the power-factor improving converter 7 of the second embodiment of FIG. 4 to the DC-DC converter 3b of the third embodiment of FIG. 5.

Accordingly, the converter of the fourth embodiment provides the effect of the DC-DC converter 3b of the third embodiment and the effect of the power-factor improving converter of the second embodiment.

Fifth Embodiment

Figure 8:
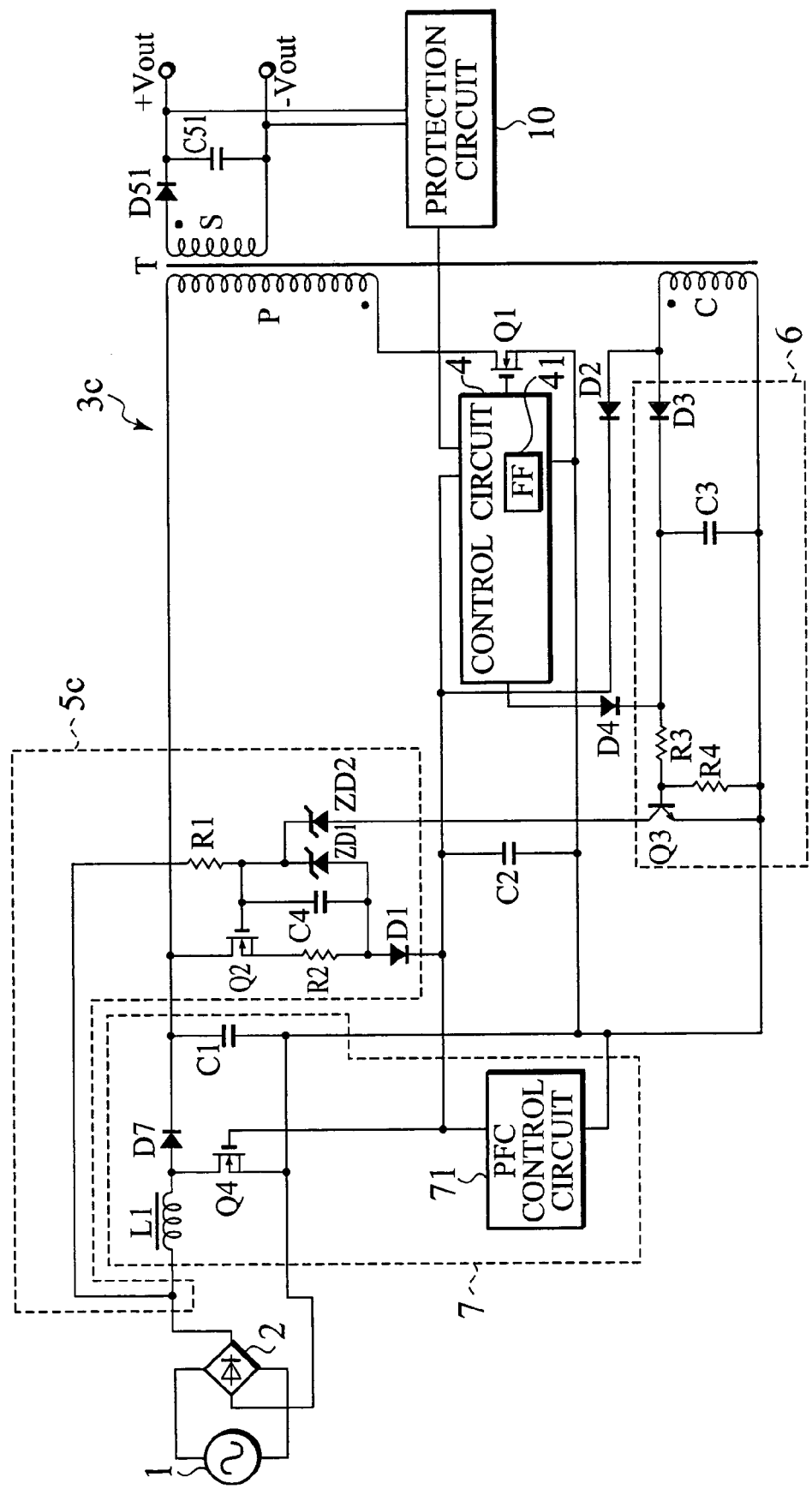
FIG. 8 is a view showing an arrangement of a converter composed of a power-factor improving converter and a DC-DC converter according to a fifth embodiment of the present invention.

FIG. 8 is a view showing a converter according to the fifth embodiment of the present invention, consisting of a power-factor improving converter and a DC-DC converter. The converter of the fifth embodiment includes the power-factor improving converter 7 and DC-DC converter 3c. In a start-up circuit 5c of the DC-DC converter 3c, a first end of a full-wave rectifying circuit 2 is connected through a resistor R1 to a gate of a switching element Q2. Between the gate of the switching element Q2 and a second end of a resistor R2, a capacitor C4 is connected. The capacitor C4 holds a bias voltage or current to the gate of the switching element Q2 for a half period of a frequency of an AC power source 1.

According to the fourth embodiment of FIG. 7, a bias voltage to the gate of the switching element Q2 of the start-up circuit 5b is obtained from the AC power source 1 through the diodes D5 and D6. According to the fifth embodiment, the bias voltage to the gate of the switching element Q2 of the start-up circuit 5c is obtained from an input stage of the power-factor improving converter 7. In this case, the voltage from the input stage of the power-factor improving converter 7 is a pulsating current waveform obtained by rectifying a sinusoidal-wave voltage of the AC power source 1, and therefore, can provide the same effect as the fourth embodiment.

Between the gate of the switching element Q2 and the second end of the resistor R2, the capacitor C4 is arranged. Even if a pulsating voltage from the full-wave rectifying circuit 2 is applied to the gate of the switching element Q2, charge accumulated in the capacitor C4 can compensate a bias voltage around a zero sinusoidal-wave voltage, so that the start-up circuit 5c can continuously operate.

Sixth Embodiment

Figure 9:
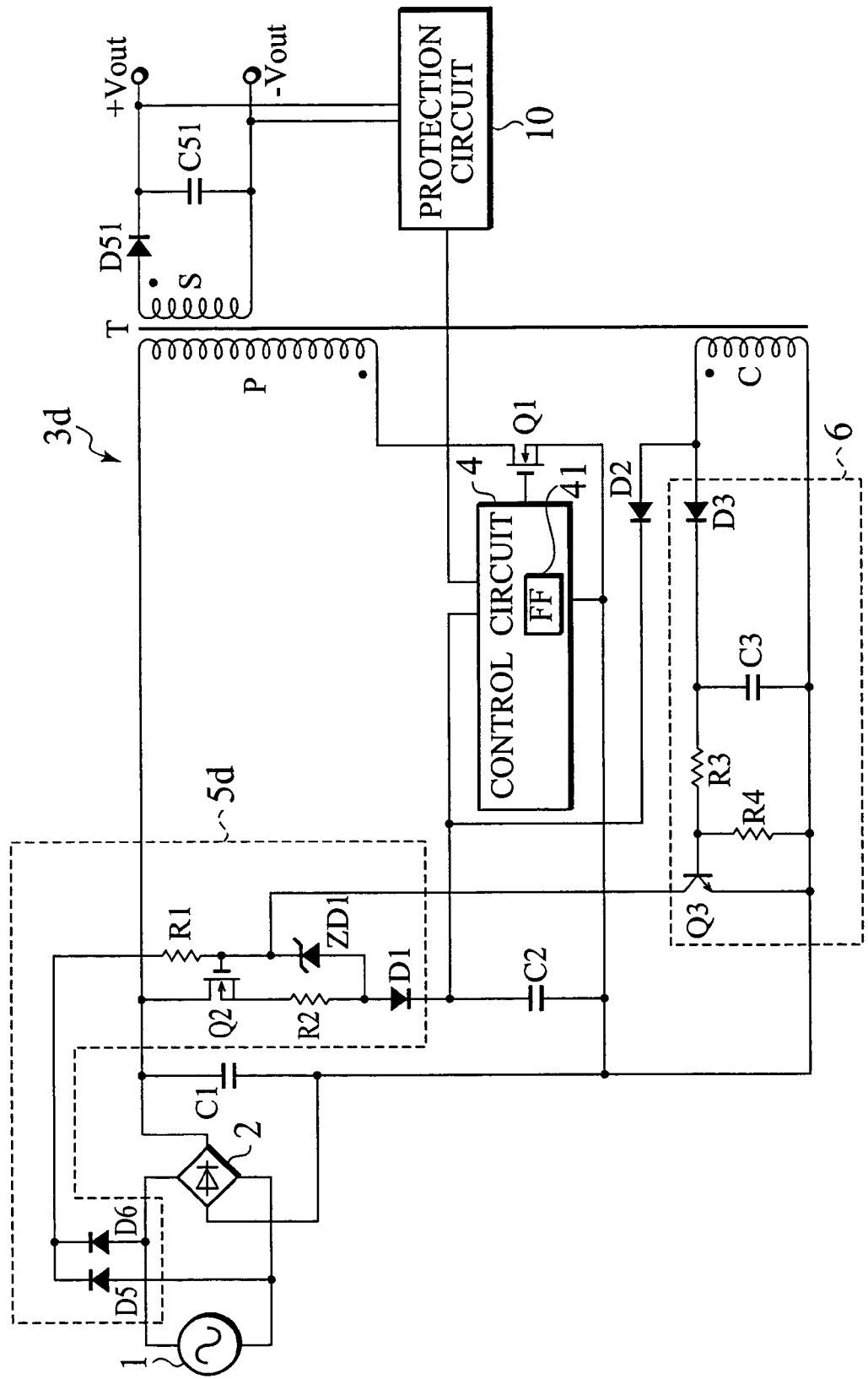
FIG. 9 is a view showing an arrangement of a DC-DC converter according to a sixth embodiment of the present invention.

FIG. 9 is a view showing an arrangement of a DC-DC converter according to the sixth embodiment of the present invention. The sixth embodiment is characterized in that a bias voltage to a gate of a switching element Q2 of a start-up circuit 5d is obtained from an AC power source 1 through diodes D5 and D6 and a resistor R1.

The other parts of FIG. 9 are the same as those of the DC-DC converter of FIG. 1, and therefore, the same parts are represented with the same reference marks.

According to the DC-DC converter of FIG. 9, a bias voltage to the gate of the switching element Q2 of the start-up circuit 5d is obtained from the AC power source 1 through the diodes D5 and D6. If the AC power source 1 is turned off, the start-up circuit 5d will never start again and the DC-DC converter will never repeatedly start and stop.

Seventh Embodiment

Figure 10:
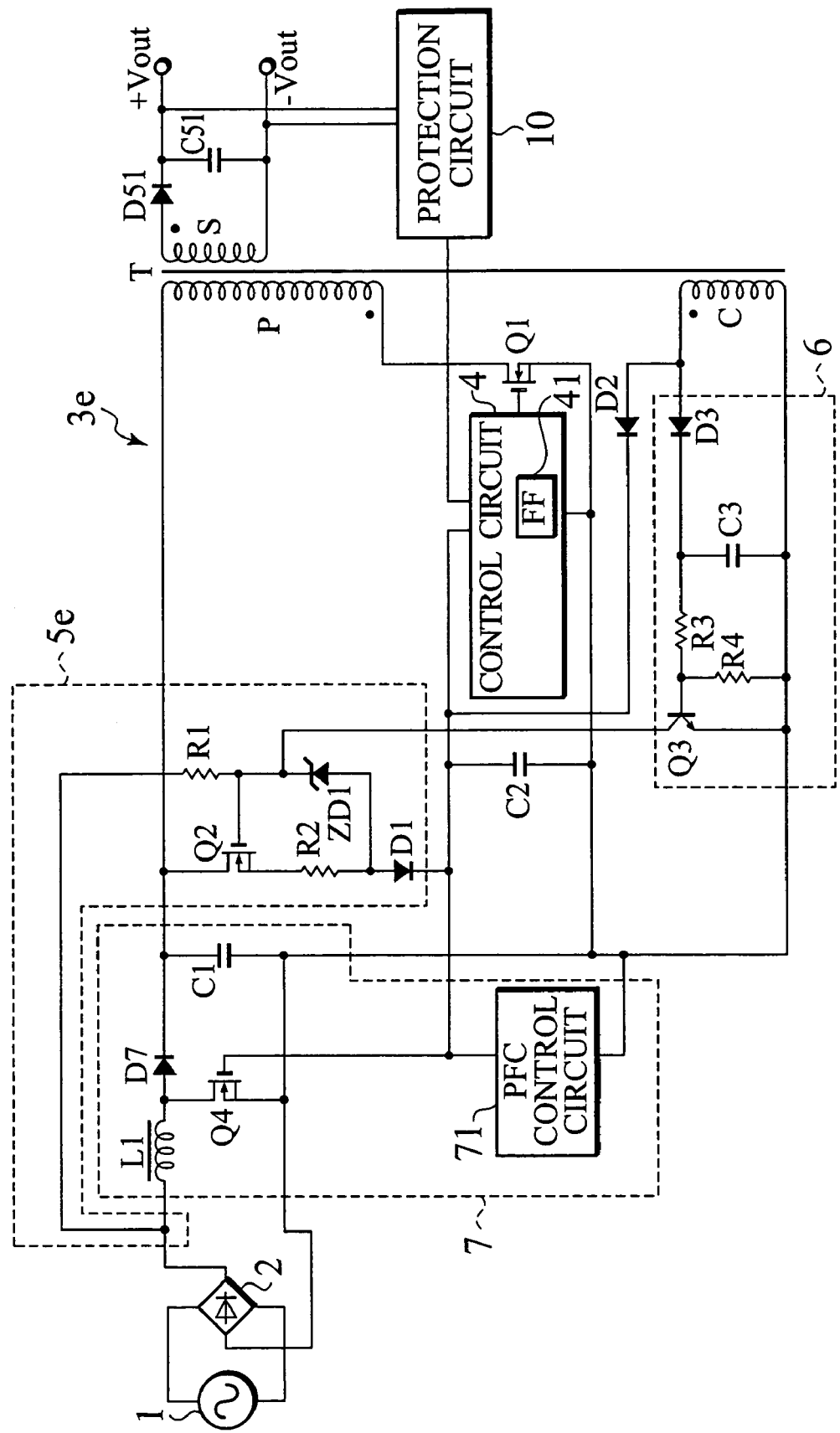
FIG. 10 is a view showing an arrangement of a converter composed of a power-factor improving converter and a DC-DC converter according to a seventh embodiment of the present invention.

FIG. 10 is a view showing an arrangement of a converter according to the seventh embodiment of the present invention, consisting of a power-factor improving converter and a DC-DC converter. The converter of the seventh embodiment includes the power-factor improving converter 7 and DC-DC converter 3e. The seventh embodiment obtains a bias voltage to a gate of a switching element Q2 of a start-up circuit 5e from an input stage of the power-factor improving converter 7. The other parts of FIG. 10 are the same as those of the DC-DC converter of FIG. 1, and therefore, the same parts are depicted by the same reference marks.

A voltage from the input stage of the power-factor improving converter 7 is a pulsating current waveform obtained by rectifying a sinusoidal-wave voltage of an AC power source 1. Accordingly, if the AC power source 1 is turned off, the start-up circuit 5e will never start again and the DC-DC converter will never repeatedly start and stop.

The present invention is not limited to the above-mentioned first to seventh embodiments. The fifth embodiment inserts the capacitor C4 between the gate of the switching element Q2 and the second end of the resistor R2. Insertion of the capacitor C4 is applicable to the third, fourth, sixth, and seventh embodiments.

EXAMPLE OF POWER-FACTOR IMPROVING CONVERTER

Figure 11:
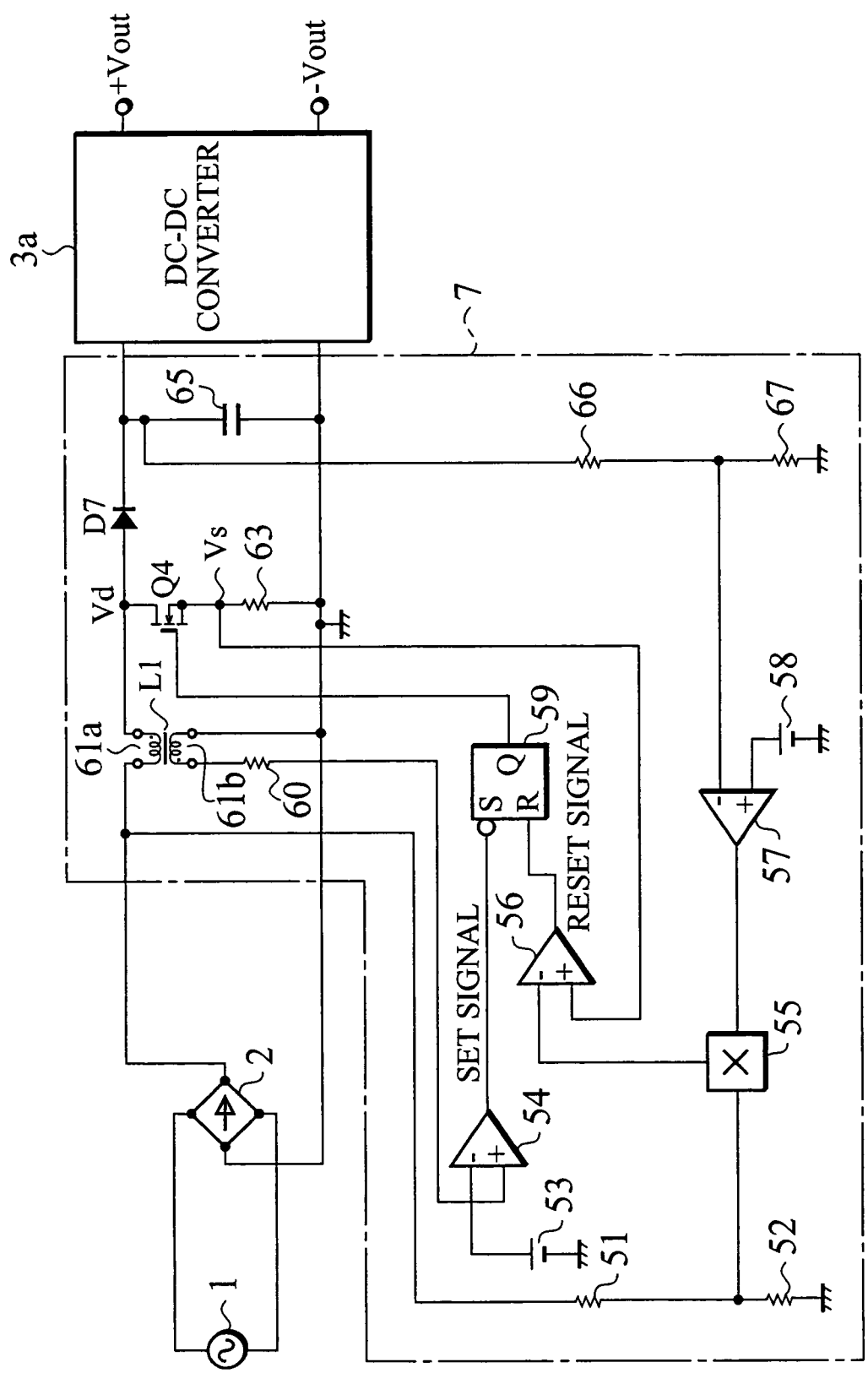
FIG. 11 is a view showing an arrangement of an example of a power-factor improving converter.

FIG. 11 is a view showing an example of an arrangement of the power-factor improving converter. The power-factor improving converter 7 steps up an input voltage from a full-wave rectifying circuit 2 to a constant DC voltage and outputs the constant DC voltage from a capacitor C1. It maintains the constant output voltage and controls an input current waveform to a sinusoidal wave that follows an input voltage waveform.

In FIG. 11, a sinusoidal-wave voltage from an AC power source 1 is full-wave rectified by the full-wave rectifying circuit 2, and the full-wave rectified waveform is supplied to the power-factor improving converter 7. The DC output of the power-factor improving converter is input to a DC-DC converter 3a. The DC-DC converter 3a converts the DC voltage from the power-factor improving converter 7 into another DC voltage and outputs the same from output terminals +Vout and −Vout.

The arrangement of the power-factor improving converter 7 will be explained in detail. The power-factor improving converter 7 basically has a step-up chopper circuit that consists of a primary winding 61a of a choke coil L1, a switching element Q4, a diode D7, and an output capacitor 65.

The choke coil L1 has the primary winding 61a and a criticality detection winding 61b. A first end of the primary winding 61a is connected to a first end of the full-wave rectifying circuit 2 and a resistor 51. A second end of the primary winding 61a is connected to a drain of the switching element Q4 made of a MOSFET and an anode of the diode D7. A first end of the criticality detection winding 61b is connected through a resistor 60 to a positive input terminal (+) of a comparator 54. A second end of the criticality detection winding 61b is grounded. A cathode of the diode D7 is connected to a first end of the output capacitor 65 and an input terminal of the DC-DC converter 3a.

Next, an arrangement of a PFC control circuit serving as a control system of the power-factor improving converter 7 will be explained. The positive input terminal (+) of the comparator 54 is grounded through the resistor 60 and criticality detection winding 61b. A negative input terminal (−) of the comparator 54 receives a first reference voltage 53. The comparator 54 compares the input voltages with each other, and if the voltage of the criticality detection winding 61b to the positive input terminal is lower than the first reference voltage 53, outputs a low-level set signal to a set terminal of a flip-flop 59.

The set terminal of the flip-flop 59 is connected to an output terminal of the comparator 54, a reset terminal thereof to an output terminal of a comparator 56, and a Q-output terminal thereof to the gate terminal of the switching element Q4. When receiving the low-level set signal from the comparator 54, the flip-flop 59 outputs a high-level drive signal from the Q-output terminal. When receiving a high-level reset signal from the comparator 56, the Q-output terminal outputs a low-level signal.

A negative input terminal (−) of an operational amplifier 57 receives a terminal voltage of the capacitor 65 divided by resistors 66 and 67, and a positive input terminal (+) thereof receives a second reference voltage 58. The operational amplifier 57 amplifies a difference signal between the divided voltage corresponding to the output voltage of the capacitor 65 and the second reference voltage 58 and provides an error signal to a multiplier 55.

A first input terminal of the multiplier 55 receives a full-wave-rectified waveform from the full-wave rectifying circuit 2 divided by resistors 51 and 52, and a second input terminal thereof receives the error signal from the operational amplifier 57. The multiplier 55 multiplies the full-wave-rectified waveform by the error signal and supplies a current target value Vm interlocked with the full-wave-rectified waveform to a negative input terminal of the comparator 56.

The negative input terminal (−) of the comparator 56 receives the current target value Vm for a switching current from the multiplier 55, and a positive input terminal (+) of the comparator 56 is connected to a current detection resistor 63 to receive, as a current detection value, a voltage corresponding to a drain-source current of the switching element Q4 in an ON period. When a switching current reaches the current target value Vm interlocked with the full-wave-rectified waveform, the comparator 56 provides a high-level reset signal to the flip-flop 59.

Operation of the power-factor improving converter will be explained. When the AC power source 1 is activated, a sinusoidal-wave voltage from the AC power source 1 is full-wave rectified by the full-wave rectifying circuit 2, and the full-wave-rectified waveform is supplied to the power-factor improving converter 7.

(1) Start-up Operation

The positive input terminal of the comparator 54 is grounded through the resistor 60 and criticality detection winding 61b. The negative input terminal of the comparator 54 receives the first reference voltage 53. The comparator 54 compares the input voltages with each other. Since the voltage to the positive input terminal is lower than the other, the comparator 54 outputs a low-level set signal to the flip-flop 59.

Figure 12:
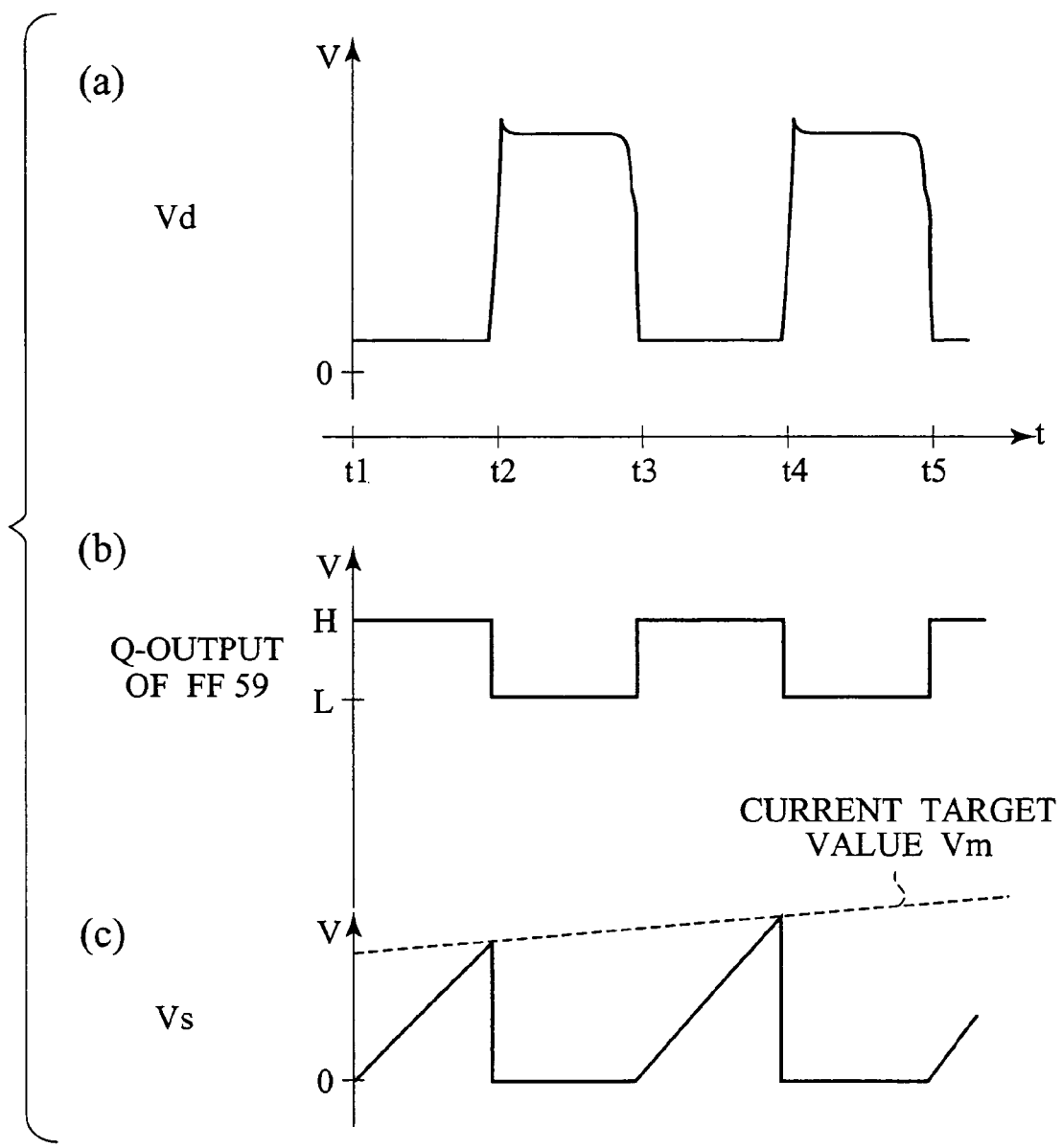
FIG. 12 is a timing chart explaining operation of the power-factor improving converter.

In response to the set signal from the comparator 54, the flip-flop 59 is set, and at timing t1 of FIG. 12, outputs a high-level drive signal from the Q-output terminal, to thereby turn on the switching element Q4.

At the timing t1 of FIG. 12, the switching element Q4 is turned on, and a drain voltage Vd of the switching element Q4 drops nearly to 0 V. A switching current flows from the full-wave rectifying circuit 2 to the ground GND through the drain-source of the switching element Q4 and the current detection resistor 63. As a result, the choke coil L1 accumulates energy.

At this time, the switching current flowing to the switching element Q4 is converted as shown in FIG. 12 into a voltage Vs by the current detection resistor 63 arranged between the source of the switching element Q4 and the ground GND. The voltage Vs is input to the positive input terminal of the comparator 56, which compares it with the current target value Vm that is interlinked with the full-wave-rectified waveform and is provided by the multiplier 55.

(2) Current Target Value Vm

An output voltage from the output capacitor 65 is divided by the resistors 66 and 67 and is input to the negative input terminal of the operational amplifier 57. The operational amplifier 57 generates a difference signal between the divided voltage and the second reference voltage 58, amplifies the difference signal into an error signal, and supplies the error signal to the multiplier 55.

The full-wave-rectified waveform from the full-wave rectifying circuit 2 is divided by the resistors 51 and 52 and is input to the multiplier 55. The multiplier 55 multiplies the error signal from the operational amplifier 57 by the full-wave-rectified waveform from the full-wave rectifying circuit 2, to provide a voltage serving as the current target value Vm interlocked with the full-wave-rectified waveform. The current target value Vm is supplied to the negative input terminal of the comparator 56.

(3) OFF Control of Switching Element

At timing t2 of FIG. 12, a switching current detected value reaches the current target value Vm interlocked with the full-wave-rectified waveform. Then, the comparator 56 provides a high-level reset signal to the flip-flop 59. In response to the reset signal from the comparator 56, the flip-flop 59 is reset, and the high-level drive signal output from the Q-output terminal is changed to a low-level signal to turn off the switching element Q4.

When the switching element Q4 is turned off, energy accumulated in the choke coil L1 and a voltage supplied from the full-wave rectifying circuit 2 are combined to charge the output capacitor 65 through the diode D7.

Namely, the output capacitor 65 receives a voltage stepped up higher than a peak value of the full-wave-rectified waveform supplied by the full-wave rectifying circuit 2.

(4) ON Control of Switching Element

When the energy accumulated in the choke coil L1 is discharged, the criticality detection winding 61b generates a ringing voltage to invert the voltage of the criticality detection winding 61b. This voltage is compared with the first reference voltage 53 by the comparator 54. At timing t3, the comparator 54 provides a low-level set signal to the flip-flop 59.

In response to the set signal from the comparator 54, the flip-flop 59 is set to provide, at the timing t3 of FIG. 12, a drive signal to turn on the switching element Q4.

As explained above, the present invention operates the start-up circuit as a constant current circuit at a start that requires a large current to shorten a start-up time, and at any time other than the start, operates the start-up circuit as a constant voltage circuit to reduce a load current and current consumption. The present invention needs no large elements nor large radiation fins, and therefore, the present invention can reduce the cost and size of the converter. When a bias voltage to the start-up circuit is from an AC power source or from a rectified pulsating current, the bias voltage disappears as soon as the AC power source is turned off, to surely stop the DC-DC converter.

The invention claimed is:

1. A converter comprising:
a first switching element being connected to a DC power source through a primary winding of a transformer;
a control circuit to conduct ON/OFF control on the first switching element;
an output rectifying/smoothing circuit to rectify and smooth a voltage induced on a secondary winding of the transformer and provide a DC output;
a voltage supply part to rectify and smooth a voltage induced on a tertiary winding of the transformer and provide the rectified and smoothed voltage as a supply voltage to the control circuit;
a start-up circuit having a constant current circuit to supply a constant current to the voltage supply part and a constant voltage circuit to supply a constant voltage to the voltage supply part; and
a start-up control circuit to operate the start-up circuit as the constant current circuit until the control circuit starts and to switch the operation of the start-up circuit from the constant current circuit operation to the constant voltage circuit operation after detecting the start of the control circuit according to a voltage generated by the tertiary winding of the transformer.

2. A converter comprising:
a first switching element being connected to a DC power source through a primary winding of a transformer and a control circuit to conduct ON/OFF control on the first switching element;
an output rectifying/smoothing circuit to rectify and smooth a voltage induced on a secondary winding of the transformer and provide a DC output and a start-up circuit to start the control circuit,
the start-up circuit operating as a constant current circuit when starting the control circuit and as a constant voltage circuit after starting the control circuit;
a start-up control circuit to detect a start of the control circuit according to a voltage generated by a tertiary winding of the transformer and switch the constant current circuit operation to the constant voltage circuit operation; and
a voltage supply part to supply the voltage generated by the tertiary winding of the transformer to the control circuit,
wherein the control circuit, if brought into a latched state by a protection circuit, provides the start-up control circuit with a latch signal whose voltage is lower than the start-up voltage and corresponds to a voltage to maintain the latched state; and
the start-up control circuit operates in response to the latch signal, to make the start-up circuit operate as the constant voltage circuit.

3. The convener of claim 1, comprising
a rectifying/smoothing circuit connected to an AC power source, to rectify and smooth AC power and produce DC power,
the AC power source and rectifying/smoothing circuit forming the DC power source.

4. A converter comprising:
a first switching element being connected to a DC power source through a primary winding of a transformer and a control circuit to conduct ON/OFF control on the first switching element;
an output rectifying/smoothing circuit to rectify and smooth a voltage induced on a secondary winding of the transformer and provide a DC output and a start-up circuit to start the control circuit,
the start-up circuit operating as a constant current circuit when starting the control circuit and as a constant voltage circuit after starting the control circuit;
a rectifying circuit connected to an AC power source, to full-wave-rectify an AC voltage; and
a power-factor improving circuit to receive a full-wave-rectified output from the rectifying circuit through a choke coil, turn on and off, rectify, and smooth the received output with a second switching element, and provide a DC output,
the AC power source, rectifying circuit, and power-factor improving circuit forming the DC power source.

5. The converter of claim 1, wherein
a bias voltage, or current to a control terminal of a start-up switching element in the start-up circuit is supplied from the DC power source.

6. The convener of claim 4, wherein
a bias voltage or current to a control terminal of a start-up switching element in the start-up circuit is supplied from the AC power source.

7. The convener of claim 4, wherein
a bias voltage or current to a control terminal of a start-up switching element in the start-up circuit is supplied from a front stage of the power-factor improving circuit.

8. A converter comprising:
a rectifying/smoothing circuit connected to an AC power source, to rectify and smooth an AC voltage;
a first switching element connected to an output side of the rectifying/smoothing circuit through a primary winding of a transformer;
a control circuit to conduct ON/OFF control on the first switching element;
an output rectifying/smoothing circuit to rectify and smooth a voltage induced on a secondary winding of the transformer and provide a DC output; and
a voltage supply part to rectify and smooth a voltage induced on the tertiary winding of the transformer and provide the rectified and smoothed voltage as a supply voltage to the control circuit;
a start-up circuit having a constant current circuit to supply a constant current to the voltage supply part;
a start-up control circuit to operate the constant current circuit of the start-up circuit until the control circuit starts and to switch the operation of the constant current circuit of the start-up circuit from operative to inoperative after detecting the start of the control circuit according to a voltage induced on the tertiary winding of the transformer, wherein
a bias voltage or current to a control terminal of a start-up switching element in the start-up circuit is supplied from an input side of the rectifying/smoothing circuit.

9. A convener comprising:
a rectifying circuit connected to an AC power source, to full-wave-rectify an AC voltage;
a power-factor improving circuit to receive a full-wave-rectified output from the rectifying circuit through a choke coil, turn on and off, rectify, and smooth the received output with a second switching element, and provide a DC output;
a first switching element being connected to an output side of the power-factor improving circuit through a primary winding of a transformer;
a control circuit to conduct ON/OFF control on the first switching element;
an output rectifying/smoothing circuit to rectify and smooth a voltage induced on a secondary winding of the transformer and provide a DC output; and
a start-up circuit having a constant current circuit to start the control circuit, the start-up circuit conducting an ON operation when starting the control circuit and an OFF operation after starting the control circuit, wherein
a bias voltage or current to a control terminal of a start-up switching element in the start-up circuit being supplied from an input side of the rectifying/smoothing circuit.

10. The converter of claim 6, wherein
the start-up circuit is provided with a capacitor being connected with the control terminal of the start-up switching element, the capacitor holding the bias voltage or current during a half period of a frequency of the AC power source.

11. The convener of claim 7, wherein
the start-up circuit is provided with a capacitor being connected with the control terminal of the start-up switching element, the capacitor holding the bias voltage or current during a half period of a frequency of the AC power source.

12. The converter of claim 8, wherein
the start-up circuit is provided with a capacitor being connected with the control terminal of the start-up switching element, the capacitor holding the bias voltage or current during a half period of a frequency of the AC power source.

13. The converter of claim 9, wherein
the start-up circuit is provided with a capacitor being connected with the control terminal of the start-up switching element, the capacitor holding the bias voltage or current during a half period of a frequency of the AC power source.

* * * * *